Patented Mar. 22, 1932

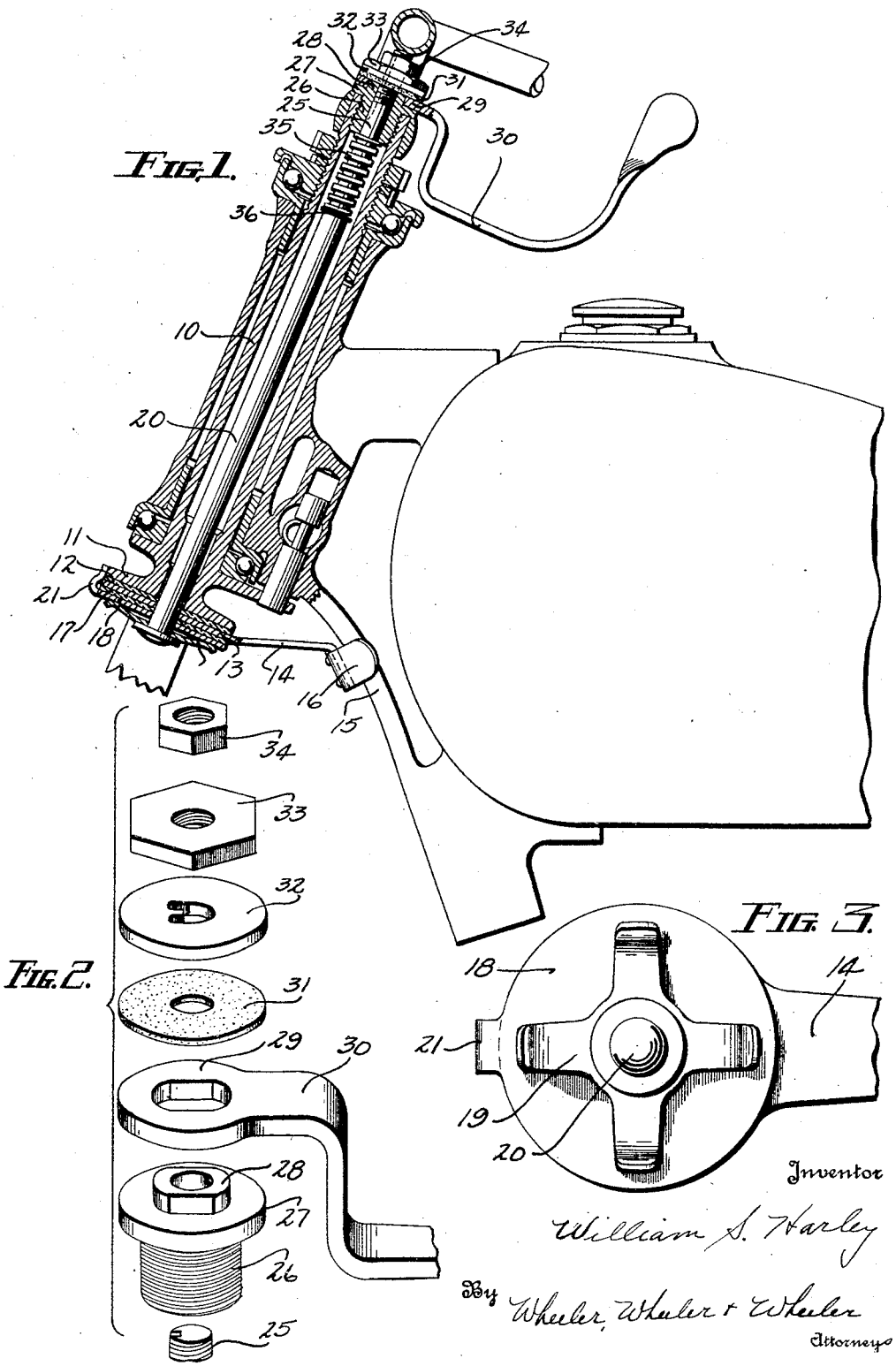

1,850,348

UNITED STATES PATENT OFFICE

WILLIAM S. HARLEY, OF MILWAUKEE, WISCONSIN, ASSIGNOR TO HARLEY-DAVIDSON MOTOR COMPANY, OF MILWAUKEE, WISCONSIN, A CORPORATION OF WISCONSIN

STEERING DAMPER

Application filed December 4, 1930. Serial No. 499,963.

This invention relates to improvements in steering dampers, and particularly to dampers for the steering heads of two wheeled vehicles, although applicable to tri-cycles or to any form of steering mechanism in which a steering post is employed to control directional movements of the vehicle.

In the steering of two wheeled vehicles, particularly motorcycles, where quick turning movements are often of extreme importance, it is desirable that the resistance to the turning movements of the steering post should be slight under normal conditions in order that the operator (rider), may steer the vehicle easily and quickly. But if any rough or rutty roads are encountered, the steering wheel is subjected to lateral pressures tending to turn it from its proper course, and under such conditions, an easily turned steering head allows dangerously quick turning movements and also subjects the rider to great exertion in his effort to hold the motorcycle to its course.

Therefore it is the object of this invention to provide improved means for varying the torque resistance of the steering post in order that the lateral pressures and shocks imposed upon the wheel by rough roads may not be transmitted in full force to the handle bars, but may be retarded and partially absorbed by resistance in the head.

An object of this invention is to provide a steering head with an axially disposed tension rod provided with frictional bearing members at its upper and lower ends in cooperation with means for independently applying resilient pressure to said members whereby the frictional resistance of one set may be varied without varying the other.

More particularly stated, it is the object of this invention to provide a steering head with means for imposing a variable resistance to turning movements of the post; to provide resiliently yielding relatively stationary and revoluble frictionally contacting members for imposing such resistance; to associate with such members manually operable means for varying the frictional pressure; and to so organize the parts that the rider or operator of the vehicle may make the desired pressure variations while the vehicle is in motion, without material interference with steering control.

In the drawings:

Figure 1 is a vertical sectional view of the steering head of a motorcycle embodying my invention, with fragments of associated parts shown in side elevation. Figure 2 is a view of the operating handle and its associated parts, detached. Figure 3 is a bottom view of the tensioning spider.

Like parts are identified by the same reference characters in both views.

The steering post 10 is formed with a base 11 which bears upon a friction disk 12 interposed between the base 11 and a flat plate 13 held against rotative movement by an arm 14 which is clamped to the member 15 of the motorcycle frame by a suitable clamping bracket 16. Another friction disk 17 is applied to the under side of the plate 13 and held thereto by a clamping plate 18. This plate is under a clamping pressure exerted by the tension bolt 20, upon a resilient spider shaped spring 19 the control portion of which is engaged by the head of the bolt, and the arms of which bear upon the plate at a distance from a central aperture in the plate through which the bolt passes. The plate 18 is proveded with an upset marginal stop flange 21 which is adapted to limit rotational movements of the plate by its engagement with the arm 14.

The tension bolt 20 extends axially through the steering post 10 and its reduced upper end portion 25 extends through an aperture in an adjustable nut 26, which is threaded into the upper end of the steering post 10. The nut 26 is provided with a flat head 27 which has a centrally disposed extension 28 fitting an opening in the flattened end 29 of an adjusting lever 30. Means are provided fixedly connecting the handle 30 with the portion 28, the latter being preferably flattened on opposite sides and fitted to a similarly contoured opening in the handle, whereby the handle may be swung to cause the nut 26 to turn in its threaded bearings with a cam action to produce corresponding upward or downward movement of the tension rod for the purpose of varying the tension of the resilient spider 19.

A friction disk 31, apertured to receive the reduced portion 25 of the bolt, is held to the upper surface of the flattened end 29 of the lever by a clamping plate 32 which is held from rotation relative to bolt 25 by key 37, and clamping nuts 33 and 34, which are threaded to the upper end of the portion 25 of the tension rod 20 and a spring 35 is coiled about the reduced portion 25 of the rod with its upper end bearing against the lower surface of the nut 26. The lower end of the spring 35 bears upon an annular shoulder 36 at the lower end of said reduced portion 25 and the upward pressure of this spring in cooperation with the frictional clamping pressure of the disk 31, tends to prevent the vibration of the head from inducing turning movements of the nut 26 and lever 30. This also allows clamping pressure to be applied to the friction disk 31 independently of the pressure of spider shaped spring 19, whereby the clamping pressure of the latter may be wholly relieved without relieving the effective pressure of the disk 31 upon the portion 29 of the adjusting lever.

The form of the spider shaped clamping spring 29 and the resistance of its arms to flexion is such that only a slight upward movement of the tension rod 20 will be sufficient to bring about the desired variations in pressure upon the friction disks 12 and 17, and the pitch of the threads on the nut 26 may be such as to develop the desired maximum pressure or relief from pressure when the lever 30 is swung through an arc of approximately 90°.

I claim:

1. Steering damper mechanism comprising the combination with a steering head, of means at the lower end of the head for frictionally resisting its turning movements, and resilient tension means for varying said frictional resistance, including a spring and a tension rod connected therewith and extending through the head with its upper end provided with an operating piece having threaded engagement with the head.

2. Steering damper mechanism comprising the combination with a steering head, of means at the lower end of the head for frictionally resisting its turning movements, a resilient member for varying said frictional resistance, a tension rod connected with said resilient member and extending through the head, and an operating piece at the upper end of the rod having threaded engagement with the head.

3. Steering damper mechanism comprising the combination with a steering head, of means at the lower end of the head for frictionally resisting its turning movements, a resilient member for varying said frictional resistance, a tension rod connected with said resilient member and extending through the head, and an operating piece at the upper end of the rod having threaded engagement with the head, and independent means for applying frictional resistance to the movements of said operating piece.

4. Steering damper mechanism comprising the combination with a cylindrical rotatively mounted steering head provided with a flanged base, of a non-rotative plate, a pressure plate, friction members interposed between said plates and between them and the flanged base, a spring adapted to apply resilient pressure to said plates and friction members, a tension rod connected with said spring and extending axially through the steering head, and a manually operable handle at the upper end of the tension rod for raising and lowering the same to vary the tension of said spring.

5. Steering damper mechanism comprising the combination of a rotative steering head having an axially movable tension rod therein, a spring tending to urge said tension rod downwardly, a feed screw for drawing it upwardly in opposition to the pressure of said spring, a handle for actuating the feed screw, means at the lower end of the tension rod for applying frictional resistance to turning movements of the head, and resilient motion transmitting connections from said rod to said means.

6. Steering damper mechanism comprising the combination with a rotative steering head having an axially movable tension rod therein, a spring tending to urge said tension rod downwardly, a feed screw for drawing it upwardly in opposition to the pressure of said spring, a handle for actuating the feed screw, and means at the lower end of the tension rod for applying resilient frictional resistance to turning movements of the head, together with means at the upper end of the rod for preventing movement of the feed screw under less than a predetermined pressure upon the operating handle.

7. Steering damper mechanism comprising the combination with a steering head, of a set of relatively fixed and rotative friction members in pressure relation to the lower end of the head, a spring bearing upon said members to determine their frictional pressure, a screw-like cam at the upper end of the head, operatively connected along the axis of the head to vary the tension of said spring, and a screw actuating lever operatively connected with said screw.

8. The combination with a rotatable steering head and a stationary member with respect to which said steering head is rotatable, of friction clutch means engageable between said steering head and member to resist rotation of said member, a clutch control handle, and resilient motion transmitting connections between said clutch control handle and said clutch means, said clutch means offering variable resistance to steering head rotation in accordance with the resilient pressure transmitted by said connections from said head.

9. The combination with means providing a bearing, of a steering head rotatably mounted in the bearing for adjustment upon its axis and provided with a substantially radial friction surface, a friction plate associated with said surface and non-rotatably connected with said bearing, and means for axially adjusting said plate respecting said surface, whereby to vary the frictional resistance thereof to the rotative adjustment of said head.

10. The combination with a steering head, of a clamp rod extending axially thereof, means including a handle at the top of said head for actuating said rod, and friction means connected with said rod and axially engageable with the lower end of the head; a frame providing a bearing for said head; and means loosely connecting said friction means non-rotatably with said frame.

11. Steering damper mechanism comprising the combination with a steering head and a frame providing a bearing therefor, of a plate frictionally engageable with said head and provided with an arm having a fork loosely engaged with the frame, and means extending through said head for drawing said plate into frictional engagement with said head.

12. Steering damper mechanism comprising the combination with a steering head and a frame providing a bearing therefor, of a member providing a radial clamping surface connected with said head, an opposed plate non-rotatably connected with said member for axial movement with respect thereto, and a relatively stationary plate interposed between said means connecting it with said frame, and means for resiliently drawing said clamping plate toward said surface, whereby frictionally to engage said relatively stationary plate.

13. Steering damper mechanism comprising the combination with a steering head and a frame providing a bearing therefor, of a member providing a radial clamping surface connected with said head, an opposed plate non-rotatably connected with said member for axial movement with respect thereto, and a relatively stationary plate interposed between said means connecting it with said frame, and means for resiliently drawing said clamping plate toward said surface, whereby frictionally to engage said relatively stationary plate, said means including a spring applied to said clamping plate, and tension means extending through said head and the handle at the upper end of said head provided with connections for the axial adjustment of said means.

WILLIAM S. HARLEY.